United States Patent

[11] 3,585,482

[72] Inventor William B. Zelina
Edinboro, Pa.
[21] Appl. No. 810,139
[22] Filed Mar. 25, 1969
[45] Patented June 15, 1971
[73] Assignee General Systems, Inc.
Erie, Pa.

[54] BATTERY-CHARGING SYSTEM WITH VOLTAGE REFERENCE MEANS WITH TWO REFERENCE LEVELS
17 Claims, 5 Drawing Figs.

[52] U.S. Cl. ................................................ 320/39,
317/33, 320/22, 320/35
[51] Int. Cl. ............................................ H02j 7/04
[50] Field of Search ........................................ 317/33;
320/30, 31, 32, 35, 39, 36, 40, 21, 22—24

[56] References Cited
UNITED STATES PATENTS
3,412,308 11/1968 Brown .......................... 320/24
3,517,294 6/1970 Ruben .......................... 320/39 X
3,305,725 2/1967 Huge et al. ..................... 320/39
3,453,519 7/1969 Hunter .......................... 320/31

Primary Examiner—Milton O. Hirshfield
Assistant Examiner—U. Weldon
Attorney—Charles L. Lovercheck ABSTRACT: A battery-charging system wherein a power-controlling device, such as a power transistor, is controlled in accordance with feedback signals representing (1) a charging current exceeding a predetermined maximum reference level and (2) a battery voltage differing from the value associated with a voltage reference, the value of which is changeable between a first value related to a desired battery float voltage and a second value related to a battery voltage a preselected magnitude higher than the desired float voltage; the voltage reference means being arranged to automatically exhibit the second value whenever the battery voltage falls below the desired float voltage and to remain at such second value until the battery has attained the preselected higher voltage when the voltage reference means will exhibit the first value and cause the battery voltage to be regulated at the desired float voltage. A temperature responsive means is included to cause the value of the voltage reference means to change with temperature in a manner corresponding with the typical change in battery voltage with temperature.

BATTERY-CHARGING SYSTEM WITH VOLTAGE REFERENCE MEANS WITH TWO REFERENCE LEVELS

This invention relates generally to current supply apparatus and more particularly to apparatus for controlling the supply of current from a current source to a load. The invention has a wide range of applications but is especially well suited for controlling the supply of current from a current source to a battery arranged in float charge service and therefore will be described in detail in that connection.

As used herein the term "float charge service" refers to an arrangement wherein the battery is continuously connected to the charging source and the load in multiple. Also the term "float voltage" refers to that voltage which will maintain a fully charged battery in a fully charged condition.

Many different charging methods are used with batteries arranged in float charge service, such as, for example, constant current charging, two rate or taper charging wherein the battery is charged at a high current rate until the battery is near full charge with a lower current rate as charging terminates, constant potential charging, and various combinations of these methods.

Ideally, a battery in float charge service should be maintained at its full capacity condition with a minimum of water consumption, while at the same time being able to have any lost capacity replenished in the shortest possible time. Also, since different type batteries are commonly used, the basic battery-charging system should be capable of accomplishing the desired results equally well with the different type batteries, such as the various acid and alkaline batteries for example. Further, different installations requiring standby battery power, because of different load demand, may require different numbers of cells and the basic battery-charging system should be capable of being adapted for use with batteries having different number of cells without requiring a major wiring change or field modification, or even a voltage measurement.

In addition, the ideal float voltage which will maintain a battery in its full capacity condition without excessive water consumption has been found to be too low to assure that lost battery capacity will be replenished, let alone that it will be replenished rapidly. For example, it has been found that a battery must attain a voltage higher than the ideal float voltage value after having been wholly or partially discharged if the battery is to have its lost capacity replenished. For simplicity this higher voltage value may at times be referred to hereinafter as the "charge voltage."

To further aggravate the problems associated with batteries in float charge service, the ideal float voltage, as well as the required charge voltage are functions of battery solution temperature. Not only that, but the float and charge voltages have different values for different type batteries. For example, the ideal float voltage for one type battery at 75° F may be 1.46 volts per cell whereas the ideal float voltage for another type battery at that same temperature may be 2.20 volts per cell.

None of the prior art battery charging apparatus, regardless of which of the previously described charge methods they employ, has been entirely satisfactory either in providing all of the foregoing conflicting requirements in a single basic charging system, or even in providing an arrangement which would automatically assure that batteries in float charge service were at all times maintained in their full capacity condition. It has been found, for example, that existing apparatus has either required constant adjustment to prevent excessive overcharging due to changing load demand or, if the apparatus employed a constant potential charging method with or without some kind of load regulation, the battery was almost always greatly undercharged or periodic maintenance procedures were required to assure that the battery would be deliberately overcharged for selected periods of time. The present invention obviates these prior art difficulties and provides a battery charger system having an automatic selection between a float voltage value and a charge voltage value as required by the system and load, together with a current limit control, so that the system automatically maintains the battery at its full capacity condition and assures that any lost capacity will be rapidly replenished to return the battery to its full capacity condition with minimum water consumption in the event of discharge. Moreover, the current limit control assures a supply of current as required by the load up to the predetermined limit for a given charger apparatus. Further, the battery-charging system may be readily made to charge acid storage batteries such as lead-acid as well as alkaline batteries, such as nickel-cadmium and nickel-iron, by merely connecting therewith a reference means appropriate for the particular type battery being charged. Accordingly, no major rewiring or modification is necessary to accommodate different type batteries.

It is an object of this invention, therefore, to provide a new and improved circuit for regulating the supply of current from a current source to a load.

It is another object of this invention to provide a new and improved circuit for rapidly returning a battery in float charge service to its full capacity condition after any discharge thereof, and for supplying current to the battery as required by the load up to a predetermined limit capacity of the apparatus and maintaining the battery at its full capacity condition.

It is still another object of this invention to provide a new and improved circuit for automatically regulating the supply of current from a current source to a battery in float charge service to regulate the battery voltage at a desired float voltage value and automatically allow the battery voltage to reach a preselected higher value whenever the battery voltage falls below the desired float voltage value to provide for the rapid return of the battery to its full capacity condition.

It is another object of this invention to provide a new and improved circuit for automatically regulating the supply of current source to a battery in float charge service to regulate the battery voltage at a desired float voltage value which changes in a predetermined manner with temperature and automatically allowing the battery voltage to reach a preselected higher voltage value whenever the battery voltage falls below the desired float voltage value for the existing temperature.

It is still a further object of this invention to provide a fully automatic battery charging system for use with acid as well as alkaline batteries which not only regulates the voltage at a desired float voltage value but automatically assures that lost capacity will be replenished rapidly.

Briefly stated, in accordance with one aspect of the invention, a battery-charging system is provided which automatically returns lost battery capacity and regulates the battery voltage at a desired voltage value to maintain the battery in its fully charged condition. The charging system includes a power control device connected in series circuit relationship between a source of charging current and a battery so that the battery receives current flow through the power control device and varies in voltage value. There is also provided a voltage reference means which is automatically selectively changeable to provide a first voltage reference value related to a first battery voltage value, which may be the desired battery float voltage, and a second voltage reference value related to a preselected higher battery voltage value. The system also includes a control circuit means for controlling the power control device to control the battery voltage in accordance with the value established by the voltage reference means. The voltage reference means includes means for selecting the second, or higher, voltage reference value thereof whenever the battery voltage is below the first voltage value or the current capacity of the charger is reached and for keeping such higher voltage reference selection until the battery attains the preselected higher voltage value, whereupon the first value is selected. Thus, when required, the battery is automatically allowed to be charged to a higher voltage value to replenish any lost capacity and thereafter has its voltage regulated at a desired value which keeps the battery in its fully charged condition.

The system may also be provided with means connected with the control circuit means for limiting the maximum output current to a predetermined level, as well as, a temperature responsive circuit means for causing the value of the reference to change in a predetermined manner with temperature. The novel features believed characteristic of the invention are set forth with particularity in the appended claims. The invention itself, however, both as to its organization and method of operation, together with further objects and advantages thereof, may best be understood by reference to the following description taken in connection with the accompanying drawing in which:

GENERAL DESCRIPTION

Figure 1:
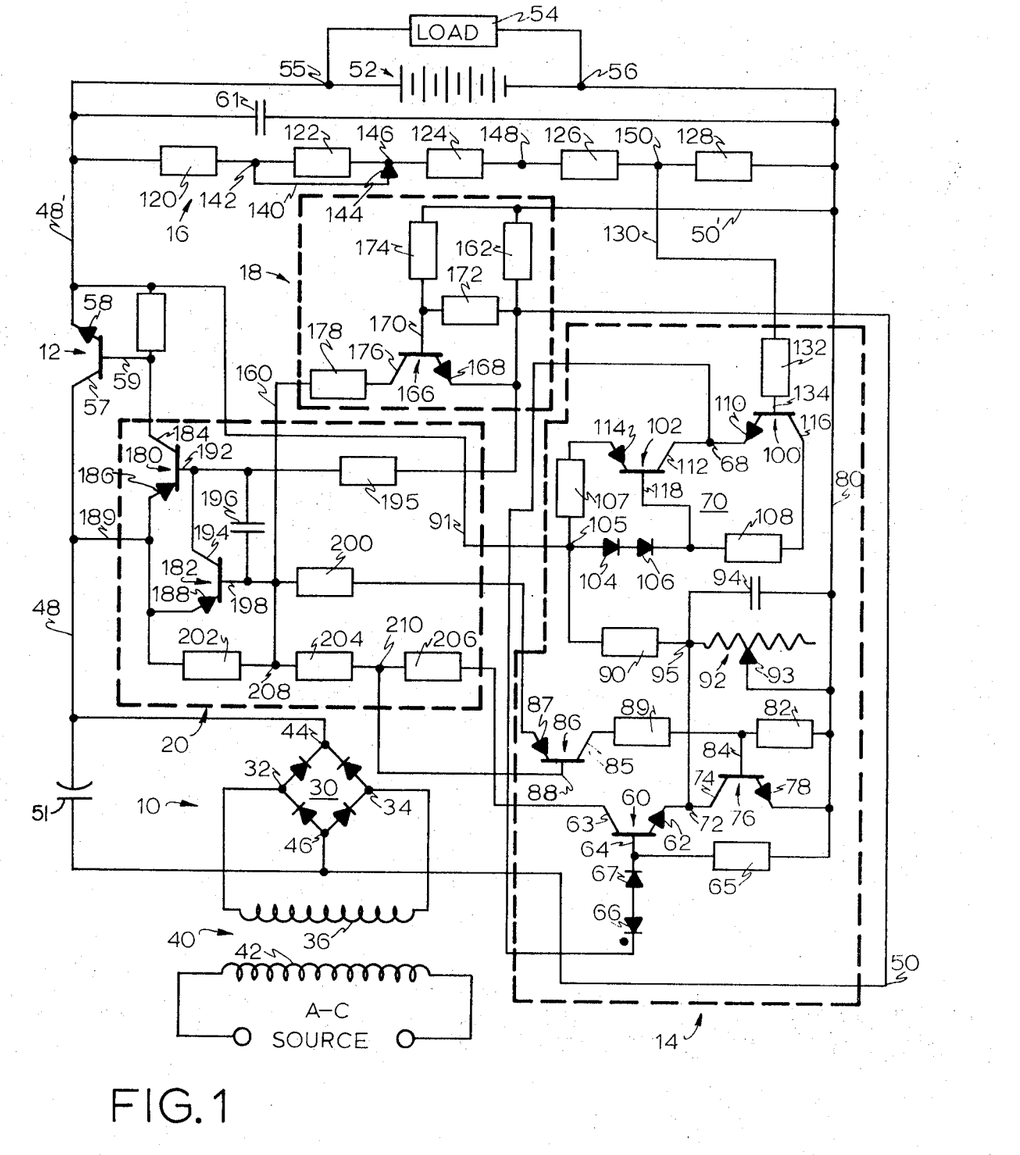
FIG. 1 is a schematic circuit diagram of a battery-charging system in accordance with one embodiment of the invention.

Referring now to the drawing, in FIG. 1 there is shown a schematic circuit diagram of a battery-charging system in accordance with one embodiment of the invention. The system shown comprises a charging voltage source 10, a power control device, shown as a series regulating power transistor 12, a voltage reference means 14, battery voltage-sensing means 16, a charging current level detecting means 18, and a control circuit means 20 for controlling the conductivity of the power transistor 12 in accordance with feedback signals relating, respectively, to battery voltage and charging current level to automatically maintain a fully charged battery at a desired float voltage value (when the load demand does not exceed the current limited capacity of the system) and to provide for the return of any lost battery capacity to bring the battery to its fully charged condition at the maximum charging current limit if, for any reason, the battery voltage falls below the desired float voltage value or the current capacity of the charger is reached.

In operation, power transistor 12 is controlled to provide for charging the battery to two different voltage values. One voltage value is the desired regulated float voltage value and the other is a preselected higher voltage value which assures charging of the battery to return it to its full capacity condition. That is, the second voltage value is the value which the battery must reach to assure that any capacity which it has lost will be replenished.

Briefly, this is accomplished by controlling the conductivity of the power transistor 12 by control circuit means 20. Control circuit means 20 receives signals for controlling power transistor 12 from two sources. One source of signals is from current level detector means 18 and provides for current limit control. The other source of signals is voltage reference means 14 and provides for voltage limit and regulation at the float voltage value.

When the charging current tends to exceed a predetermined level, a signal is applied from current level detector means 18 to control circuit means 20 causing the conductivity of power transistor 12 to be decreased. This in turn causes a reduction in the charger output voltage tending to return the charging current to the predetermined level. Once the current limit value is reached, however, there is a change in the voltage reference value so that the charger will continue to charge at this maximum rate until the higher battery voltage is reached.

Also, when the battery voltage tends to exceed the desired float voltage value, a signal is applied from voltage reference means 14 to control circuit means 20 similarly causing the conductivity of power transistor 12 to be decreased and bringing the voltage back to the desired float voltage value thereby tending to maintain the battery at such float voltage value.

If, because of the operation of the current limit control or for any reason the battery voltage falls below the desired float voltage value, then the value of the voltage reference of voltage reference means 14 is automatically changed to a higher value and maintained or "latched" at that higher value until the battery attains a desired higher voltage value. For example, under the foregoing condition no signal will be applied from reference means 14 to control circuit means 20 to cause a decrease in the conductivity of power transistor 12 until the battery has reached the higher voltage value established by the higher value of the voltage reference. Once the battery has reached this higher voltage value, however, the voltage reference is automatically and abruptly changed to the lower value. Since this lower reference value is associated with the desired float voltage value, power transistor 12 will be turned completely off and will remain off until the battery voltage falls to the float voltage value, whereupon the system will again regulate the battery voltage at the desired float voltage value.

DETAILED DESCRIPTION

There will now be provided a detailed description of the arrangements employed to provide the various system functions, together with a more complete description of the organization and operation of the system shown in FIG. 1. Although in the foregoing and following description specific terms are used for clarity in setting forth the invention, these terms are intended to refer only to the arrangement illustrated in the drawing and are not intended to define or limit the scope of the invention.

CHARGING VOLTAGE SOURCE

The charging voltage source 10 is shown as a bridge rectifier 30 operating from an AC voltage source, which may be commercial AC power for example. As shown, the terminals 32 and 34 of bridge rectifier 30 are connected with the secondary winding 36 of a transformer 40, the primary winding 42 of which is adapted for connection with an AC voltage source. Transformer 40 provides an isolated AC voltage capable, when rectified by rectifier 30, of supplying the maximum charging voltage at the maximum current as limited by the particular charging system, at the lowest input voltage. The remaining rectifier terminals 44 and 46 are connected with conductors 48–48' and 50–50' which provide the positive and negative sides, respectively, of the charging voltage source 10. A filtering capacitance 51 is shown connected across rectifier terminals 44 and 46.

Power transistor 12 is connected between rectifier 30 and a battery 52, which has a load 54 connected to the terminals 55 and 56 thereof. To this end, the collector electrode 57 and emitter electrode 58 of power transistor 12 are connected in series with conductor 48–48'. The base electrode 59 of power transistor 12 is connected through a resistance to conductor 48' and also to control circuit means 20. From the foregoing description it will be observed that battery 52 is connected in float charge service and receives current flow through power transistor 12 and varies in voltage value. A filtering capacitance 61 is shown connected across battery 52, although such capacitance is not required for all applications.

As previously indicated, the battery-charging system of the invention provides for the control of charging current to maintain the battery at a desired float voltage value up to the maximum output of the system and automatically allows the battery to obtain a preselected higher voltage value whenever the battery voltage falls below that desired float voltage value to thereby assure that any lost battery capacity will be restored.

VOLTAGE REFERENCE MEANS

To provide for the automatic regulation of the battery voltage at a desired float voltage value, while allowing the battery to attain a preselected higher voltage value when required, there is provided a voltage reference means 14 which is automatically changeable between a first voltage reference value and a second voltage reference value. The first voltage reference value relates to the desired float voltage value for the battery and the second voltage reference value relates to a preselected higher or charging voltage value. This is accomplished in the system shown in FIG. 1 by providing a first voltage reference portion, such as a Zener diode device, to which a second portion of voltage reference is automatically added whenever the battery voltage falls below the value established by the first reference portion and which second portion is "latched in" with the first reference portion until the battery attains a voltage corresponding to that established by the sum of the first and second reference portions. As shown in FIG. 1, voltage reference means 14 also includes a temperature responsive means which causes the value of the voltage reference means 14 to change in a predetermined manner with temperature. Conveniently, a circuit means 70 is also included in voltage reference means 14 to minimize loading of the voltage divider of the voltage-measuring means 16.

Voltage reference means 14 comprises a transistor device 60, having an emitter electrode 62, a collector electrode 63 and a base electrode 64, a Zener diode device 66 and one or more diode devices 67 making up the first voltage reference portion. The base electrode 64 of transistor 60 is connected through resistance 65 to conductor 80 and through a diode 67 with the anode of Zener diode device 66, whose cathode is connected with the junction 68 of the circuit means 70. The emitter electrode 62 of transistor 60 is connected at the junction 72 with the collector electrode 74 of a latching transistor switch means 76, the emitter electrode 78 of which is connected with battery terminal 56 over conductor 80. A resistance 82 is connected from the base electrode 84 of transistor 76 to conductor 80. Also connected with base electrode 84 through resistance 89 is the collector electrode 85 of a latching control transistor 86, the emitter electrode 87 and base electrode 88 of which are connected with control circuit means 20, in a manner to be described, to cause the second portion of the voltage reference means 14 to be included as part of the voltage reference value thereof whenever, for any reason, the battery voltage falls below the desired float voltage value and to remain therein until the battery attains the preselected higher voltage value to which the second voltage reference value relates.

The second portion of voltage reference means 14 is provided by connecting a voltage divider means across battery 52 and picking a portion of the battery voltage from such voltage divider. To this end, the voltage divider includes a resistance 90 connected over conductor 91 to conductor 48' and a potentiometer 92 which has its movable tap 93 connected with conductor 80. A capacitance 94 is connected from the junction 95 between resistance 90 and potentiometer 92 to conductor 80. Junction 95 is also connected with the junction 72 between the emitter electrode 62 of transistor 60 and the collector electrode 74 of latching transistor 76.

From the foregoing description it will be observed that the voltage reference means 14 exhibits a value made up of the sum of the first and second portions as long as transistor 76 is nonconducting. On the other hand, when transistor 76 is conducting (saturated), the second portion provided by potentiometer 92 does not appear as part of the value of the voltage reference means 14. That is, voltage reference means 14 exhibits a first voltage reference value when transistor 76 is saturated and a second higher voltage reference value when transistor 76 is nonconducting.

Since, as previously indicated, the battery voltage value changes in a predetermined manner with temperature, it is desirable to provide for a corresponding change in the value of the voltage reference. Accordingly, in the arrangement shown in FIG. 1 temperature responsive means is provided which is operative to cause the value of the voltage reference to change with temperature in a manner corresponding with the change in battery voltage with temperature. This is accomplished by providing for the series combination of a suitable number of semiconductor barriers to assure that the value of the voltage reference provided by voltage reference means 14 is always related to the proper battery voltage value for any battery temperature condition. For example, the barrier voltage value of a semiconductor P-N junction varies in a particular manner with temperature. Accordingly, a Zener diode 66, one or more diodes 67, and transistor 60 may be selected taking into account their particular temperature characteristics so that a combination of such devices will provide the desired overall temperature characteristic of the voltage reference means 14. Usually, the addition of one or more diode devices 67 in series combination with the basic reference loop comprising Zener diode 66 and transistor 60 will provide this characteristic.

Figure 2:
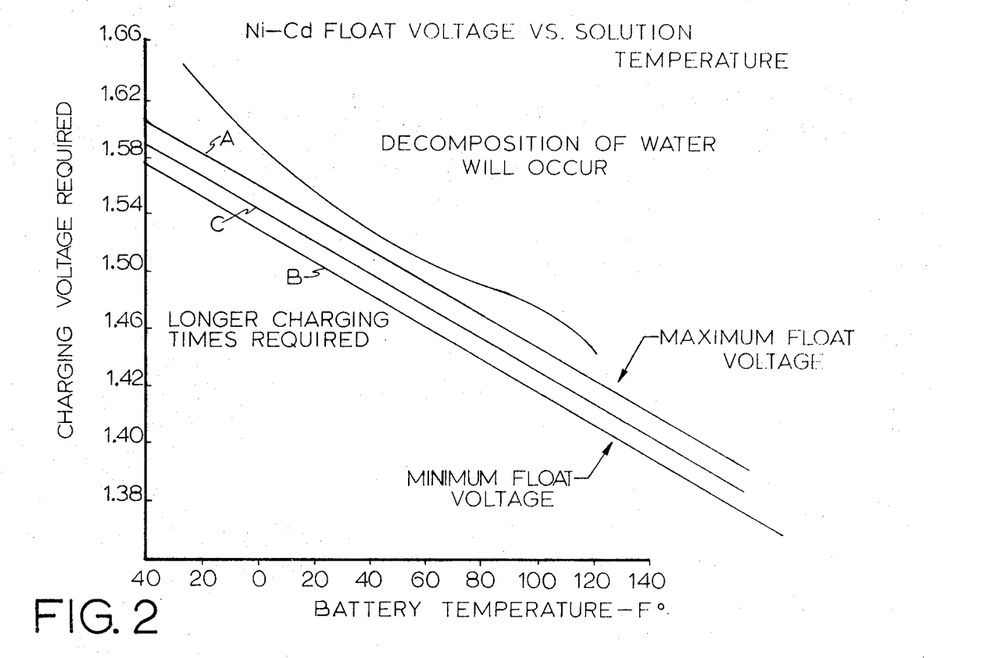
FIG. 2 is a characteristic curve of a nickel-cadmium battery showing the change in voltage with temperature.
Figure 3:
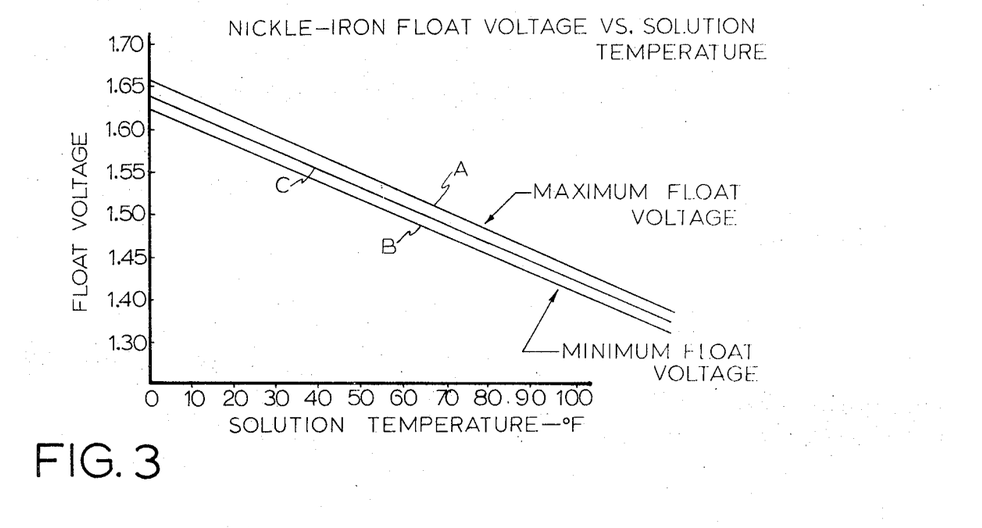
FIG. 3 is a characteristic curve of a nickel-iron battery showing the change in voltage with temperature.
Figure 4:
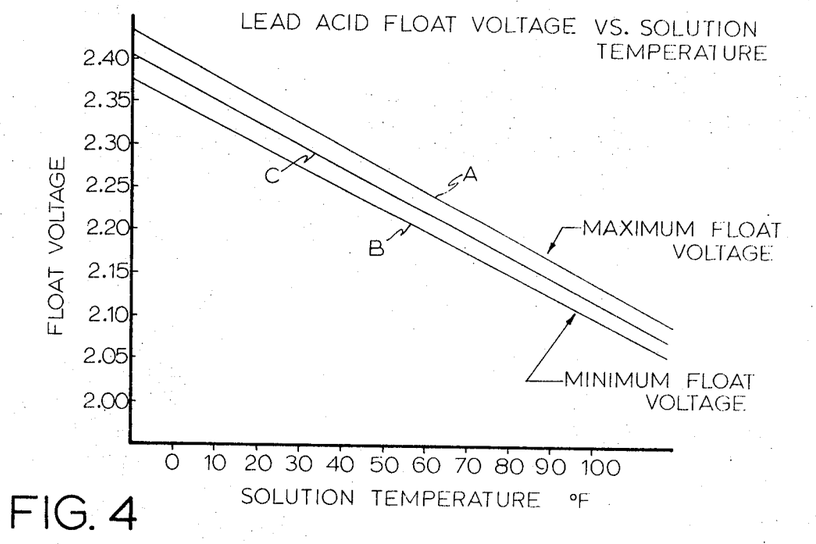
FIG. 4 is a similar characteristic curve of a lead-acid battery showing the change in voltage with temperature; and, FIG. 5 is a plot of charger output voltage and current for the arrangement of FIG. 1 to illustrate the characteristic regulated.

The required characteristic may best be understood by reference to FIGS. 2, 3, and 4 which illustrate the change in battery voltage with battery solution temperature for nickel-cadmium, nickel-iron and lead-acid batteries, respectively. As shown, the curves designated A in the figures represent the voltage value above which excessive water decomposition occurs, while the curves designated B in the figures represent the voltage values below which an excessive charging time would be required. Accordingly, the temperature responsive means is arranged to cause a change in the value of the reference means 14 to regulate the battery voltage on a curve intermediate the curves A and B, such as the curves C in FIGS. 2, 3, and 4 for example.

Circuit means 70 which minimizes loading of voltage divider 16 comprises a pair of transistor devices 100 and 102 and a pair of diodes 104 and 106 interconnected with a pair of resistances 107 and 108. Transistor 100 has its emitter electrode 110 connected with the junction 68 to which the collector electrode 112 of transistor 102 is also connected. The emitter electrode 114 of transistor 102 is connected through resistance 107, diodes 104 and 106, and resistance 108 to the collector electrode 116 of transistor 100. The base electrode 118 of transistor 102 is connected with the junction between diode 106 and resistance 108. The junction 105 between resistance 107 and diode 104 is connected with conductor 91 and thence with conductor 48' and the positive terminal 55 of battery 52.

BATTERY VOLTAGE SENSING MEANS

Battery voltage-sensing means 16 comprises a voltage divider including a plurality of resistances 120, 122, 124, 126 and 128. A portion of voltage proportional to the battery voltage is developed across resistance 128 and is applied as a voltage feedback signal over conductor 130 and, through resistance 132, to the base electrode 134 of transistor 100 of temperature responsive voltage reference means 14. Battery voltage-sensing means 16 is arranged to provide a proper feedback signal over conductor 130 for batteries having different number of cells. To this end, a movable connection 140 is provided having one end connected to the junction 142 between resistances 120 and 122 and the other end 144 adapted for connection with one of the other junctions 146, 148 or 150. In the particular arrangement illustrated, the voltage divider is arranged to provide for batteries having a variation of three cells, such as for example, between five and eight cells. The junction 142 then represents the connection for eight cells, junction 146 the connection for seven cells, junction 148 the connection for six cells and junction 150 the connection for five cells. As shown in FIG. 1, therefore, with the end 144 of movable connection 140 connected with the junction 146, the system would be adjusted for a battery 52 having seven cells. It will be readily understood that the voltage divider may be made to accommodate batteries having any variation in numbers of cells. For practical purposes a variation of two or three cells is usually sufficient.

CURRENT LIMIT CONTROL

The current limit control is provided by developing a current limit feedback signal in charging current level detecting means 18 which signal is applied over conductor 160 to the control circuit means 20 whenever the charging current exceeds a predetermined level. Charging current level-detecting means 18 comprises a current-measuring means, shown as shunt 162 connected in series between conductors 50 and 50', so that the total charging current flows through such current measuring shunt means. Current level-detecting means 18 also includes a transistor 166 connected across the current-measuring shunt means 162 and to the control circuit means 20. Transistor 166 is arranged to begin conducting when the current through current-measuring shunt means 162 exceeds a predetermined level. When transistor 166 conducts, control circuit means 20 operates to decrease the conductivity of power transistor 166.

As shown in FIG. 1, transistor 166 has its emitter electrode 168 connected to conductor 50, on one side of current measuring shunt means 162, and its base electrode 170 connected to conductor 50' on the other side of the current measuring shunt means 162. A resistance 172 is connected between base electrode 170 and conductor 50 and a resistance 174 is connected between base electrode 170 and conductor 50'. Resistances 172 and 174 are provided to trim the current limit value by simple voltage divider action. Since transistor 160 begins to conduct when the voltage between its emitter and base electrodes is about 0.6 volts, resistances 172 and 174 are selected to make the shunt voltage any value greater than o.6 volts. The collector electrode 176 of transistor 166 is connected through resistance 178 to conductor 160 and thence to control circuit means 20.

CONTROL CIRCUIT MEANS

Control circuit means 20 comprises first and second control transistors 180 and 182. Transistor 180 has its collector electrode 184 connected with base electrode 59 of power transistor 12. The emitter electrode 186 of transistor 180 is connected to emitter electrode 188 of transistor 182 and over conductor 189 to the positive conductor 48. The base electrode 192 of transistor 180 is connected with the collector electrode 194 of transistor 182 and also through bias resistance 195 to the negative conductor 50. A capacitance 196 is connected between base electrode 198 of transistor 182 and base electrode 192 of transistor 180. Base electrode 198 of transistor 182 is connected over conductor 160 to current level detective means 18 and also through resistance 200 to the emitter 87 of latching control transistor 86.

Control circuit means 20 also includes a voltage divider means, including resistances 202, 204 and 206, connected between the positive conductor 48 and the collector electrode 63 of transistor 60. The junction 208 between resistances 202 and 204 is connected with base electrode 198 of transistor 182 while the junction 210, between resistances 204 and 206 is connected with base electrode 88 of latching control transistor 86. For reasons which will later become evident from the description of the operation of the charging system, resistances 195 and 204 are both selected to be much larger than resistance 202.

OPERATION

The control of power transistor 12 is provided by control transistors 180 and 182 of control circuit means 20. Power transistor 12 is rendered conductive by the collector current of transistor 180 which transistor is in turn biased normally conducting by the base current which flows in the path established through resistance 195. Control transistor 182 controls the conductivity of transistor 180 by providing a path to bypass base current from transistor 180. Accordingly, when transistor 182 conducts, base current is bypassed therethrough from transistor 180 and the conductivity of transistor 180 is decreased. A decrease in conductivity of transistor 180 results in a decrease in conductivity of power transistor 12 and a decrease in the current supplied to the battery. The arrangement of power transistor 12 and control transistors 180 and 182 is such that transistor 12 may be varied in conductivity over the range from completely on to completely off as required.

Control transistor 182 is arranged to receive a signal at its base electrode 198 from two separate circuits; (1) the current level-detecting means 18, to provide for current limit control, and (2) the voltage reference means 14 to provide for voltage limit and regulation of the battery float voltage. Thus, when transistor 182 is receiving an emitter to base signal from either of these two sources, the drive on transistor 180 is reduced to cause a decrease in the conductivity thereof. The decrease in conductivity of transistor 180 causes a reduced drive on power transistor 12 and hence a decrease in its conductivity also.

CURRENT LIMIT CONTROL

As illustrated in FIG. 1, current-measuring shunt means 162 is located so that the entire charging current flows through it. Transistor 166 requires approximately 0.6 volts base to emitter to initiate conduction therein. Thus, when the charger current reaches a value where this base to emitter voltage is developed, transistor 166 begins to conduct through resistance 178 to apply a signal to the base electrode 198 of transistor 182 which, as previously described, operates through transistor 180 to reduce the drive on power transistor 12 and the conductivity thereof to limit any further increase of charger output current.

VOLTAGE CONTROL

As already discussed briefly the battery-charging system of the invention is arranged to automatically charge the battery at either of two voltage values as required by load demand to return the battery to its full capacity condition and keep it in that condition. That is, the charger system always returns the battery to its full capacity condition and thereafter regulates the battery voltage at a desired float voltage value to keep the battery at its full capacity condition if load demand does not exceed the current limit capacity of the system. Thus, any time the battery looses capacity, as evidenced by drop in the voltage thereof from the desired float voltage value, the battery is automatically charged to the higher voltage value which assures its return to its full capacity condition.

Figure 5:
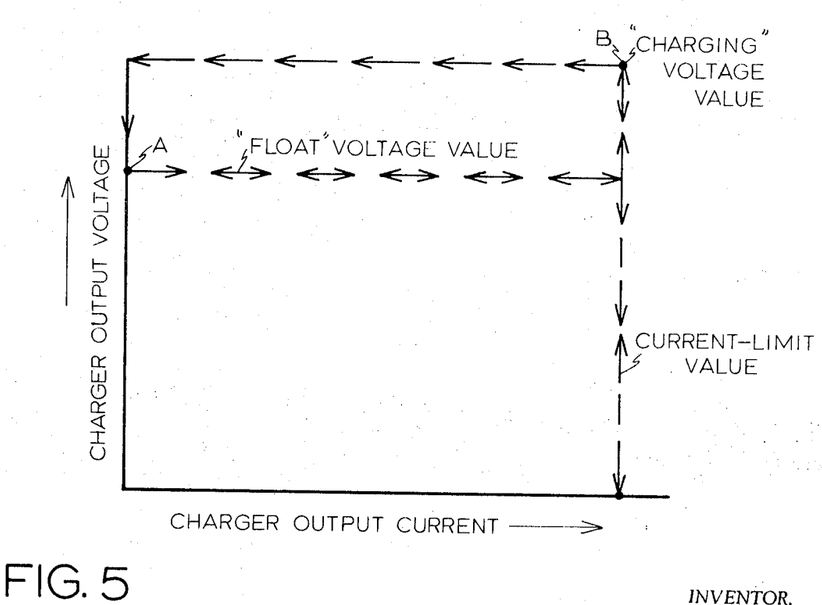

In FIG. 5 there is shown a plot of charger output voltage and current which illustrates the characteristic which the charger system will regulate. The voltage value designated by the letter "A" represents the desired float voltage value for the particular type battery being charged. Also, the voltage value designated by the letter "B" represents the preselected higher voltage value which the battery is allowed to attain to assure that any lost capacity will be replenished. For convenience this higher voltage value may also be referred to herein as the "peak point voltage." As shown, the charger output voltage rises at a constant current until a value of voltage is reached equal to the higher of the two voltage values, that is, value "B." As soon as this voltage value is reached, the charger system switches automatically to zero output and eventually to regulation at the lower voltage value, that is, the desired float voltage value "A."

This dual mode of operation may best be explained by further reference to FIG. 5 wherein the solid arrows show the direction the battery voltage and current change under typical operating conditions. The battery terminal voltage rises until the voltage value B is reached. The system then changes automatically to the lower voltage value A which switches the charger output completely to zero since, temporarily, the battery has been charged to a voltage greater than the desire float voltage value which is to be regulated. Since the battery is in float charge service and the charger output has now been completely turned off, the battery voltage will begin to fall and will continue to fall until the desired float voltage value is reached. That is, with the charger output cut off, the continuous current requirements of the using equipment connected to the battery and/or the internal losses of the battery must be supplied from the battery with a consequent decrease in the battery terminal voltage. When the battery voltage has fallen from the higher value to the desired float voltage value, the system assumes its float voltage-regulating mode of operation. In this mode of operation the charger system supplies all the current required to overcome the internal losses of the battery plus the continuous current requirements of the using equipment. Accordingly, the charge capacity is suitably selected to be well above the sum of these two current requirements. For example, in a typical installation if the sum of the internal battery loses and continuous current requirements of the using equipment were between 0.5 and 1.0 amps., a battery charger having a current limited capacity of two amperes would be suitable. On the other hand, for an installation where the sum of these two current requirements may be between 1.0 and 3.0 amps., a charger having a higher current limit capacity should be selected. For example, a charger having a current limited capacity of about 6 amperes would be suitable.

The broken arrows in FIG. 5 show the charger current and voltage as the demand of the using equipment increases. If this demand exceeds the current limit capacity of the charger, the current limit control of the system becomes operative and the additional current requirements must be supplied by the battery. As soon as the capacity of the charger is reached, the system switches automatically to the higher voltage charging mode and the battery will again be charged until this higher voltage value is reached, whereupon it will again automatically switch to zero and the float voltage regulating mode of operation.

For example, as the battery voltage rises a proportional part thereof appears across resistance 128 of the voltage divider making up the voltage-measuring means 16. Also, as a result of voltage divider action of potentiometer 92, resistance 90, and the battery voltage, a proportional part of the battery voltage appears on potentiometer 92. The portion of the battery voltage appearing across resistance 128 is applied over conductor 130 to the voltage reference means 14.

The voltage reference means 14 shown includes active elements (transistors 100 and 102) to limit loading on voltage measuring means 16 to a very low value so that the integrity of the voltage divider is maintained in changing from one number of cells to another. To simplify the description at this time assume that the first portion of the voltage reference is provided only by the Zener diode 66. The full reference value is, of course, made up of the combination of the Zener diode 66, the barrier voltages of the diodes 67, the base-emitter junction barrier of transistors 100 and 60 and the voltage provided by potentiometer 92, which latter voltage is, of course, removed when transistor 76 becomes saturated.

When the voltage appearing on resistance 128 exceeds the breakover voltage of Zener diode 66, plus the barrier voltage of diodes 67, plus the base to emitter voltage of transistors 100 and 60, plus the voltage appearing on potentiometer 92, a base current flows into transistor 60 and that transistor begins to conduct. This current is amplified by transistor 60 so that a much larger current flows through resistance 206 and the collector-emitter circuit of transistor 60. Since resistance 204 is much larger than resistance 202, transistor 86 begins to conduct due to the base current which is bypassed from transistor 182. Transistor 86 therefor conducts through resistance 89 to the base electrode 84 of transistor 76. Since resistance 195 is also much larger than resistance 202, transistor 76 also begins to conduct while transistor 182 remains unaffected.

When transistor 76 conducts, current is bypassed from potentiometer 92 since the collector-emitter circuit of such transistor is connected in shunt with the potentiometer. Accordingly, the voltage drop across potentiometer 92 is reduced. The voltage drop across potentiometer 92 provides the second portion of the voltage reference so that the decrease in the value thereof due to the initiation of conduction of transistor 76 acts regeneratively in that still more current will be allowed to flow into the base of transistor 60 which in turn causes transistor 76 to become more conductive further decreasing the voltage. The net result is that transistor 76 quickly becomes saturated thereby completely shorting out the second portion of the voltage reference provided by potentiometer 92. When transistor 76 becomes saturated, the value of voltage reference means 14 is abruptly switched from the higher voltage value, corresponding to voltage level "B" to the lower voltage value, corresponding to the desired float voltage value "A" (FIG. 5).

From the foregoing description, it will be evident that a fixed value of change in the value of the voltage reference takes place as soon as the battery attains the higher voltage value established when the reference includes both the first and the second portions. Moreover, the action is abrupt and occurs at a very definite voltage value.

Once the battery voltage falls to the desired float voltage value the charger regulates the battery at that voltage, provided that the current requirements of the load and the battery internal loses do not exceed the current limit capacity of the charger. That is, the charger will attempt to hold the float voltage value by supplying any and all loads, including the current required to overcome the battery internal loses, up to its current limit capacity. For example, transistor 60 begins to conduct when the charger output attempts to exceed the value of the voltage reference as previously described. When transistor 76 is saturated, the voltage reference does not include the second portion provided by potentiometer 92. The collector-emitter current of transistor 60 is amplified in part by transistor 76 and is applied to the base electrode 198 of transistor 182 via connection 208 and resistor 200 causing transistor 182 to become conducting which in turn decreases the conduction of transistor 180 and also the conduction of power transistor 12. Accordingly, depending upon the conducting condition of transistor 182, power transistor 12 may have its conductivity varied over the entire range from fully on to fully off.

In the arrangement shown in FIG. 1, resistance 200 has been included to improve the regulating stability of the charger. For example, current flowing in resistances 200 and 204 reduces the current gain of transistor 86 and allows for better stabilization of the charger voltage regulation.

From the foregoing description it will be clear that the second portion of the voltage reference means 14 must provide an amount of voltage reference so that when combined with the first portion it will allow the battery to attain a voltage value high enough to assure the return of the battery to its full capacity condition. The total voltage reference value, however, must not be so high that the battery can never attain the voltage established by it. To provide for the preselection of the proper higher, or peak-point, voltage value for the system, potentiometer 92 is adjusted under actual operating conditions and with the battery and using equipment with which it is to function.

The peak point voltage value is preselected in the following manner. When the charger is initially connected, potentiometer 92 is adjusted to provide for the development of the maximum voltage drop across it. Accordingly, in the arrangement shown in FIG. 1 the movable tap 93 would be initially moved to the lowermost position. The charger will then supply current to the battery at the maximum current limit capacity thereof in an attempt to bring the battery voltage up to the voltage value established by the voltage reference. With the movable tap 93 at the lower most position, however, this value of the voltage reference establishes a voltage value for the battery so high that the battery can never reach it regardless of how long it is allowed to charge. Accordingly, after charging for some period of time at the maximum current limit capacity of the charger, the battery will have attained its full capacity condition. In practice this condition is very conveniently determined by observation of the battery terminal voltage. For example, when there has been no change in the battery terminal voltage for several hours while the battery is being charged at the maximum current limit capacity of the charger, the battery will be in its full capacity condition.

With the battery now known to be fully charged, the movable tap 93 is slowly moved upward until the actual battery voltage and the voltage reference value are in proper correspondence. As soon as this occurs, of course, the charger output will be automatically switched off. Usually, the voltage reference should be set just a little below the point where the charger output was switched off to assure that under different tolerance conditions the battery will always be able to attain the preselected peak-point voltage as set.

With the peak point voltage value preselected in the foregoing described manner, whenever thereafter the battery voltage falls below the desired float voltage value the voltage reference means 14 exhibits its higher voltage value thereby allowing the battery to charge until the peak-point voltage value is reached. As described, when the battery reaches this peak-point voltage value it is in its full capacity condition. Accordingly, the charger system always automatically returns the battery to its full capacity condition so that regulation thereafter at the float voltage value will keep the battery in such full capacity condition.

Included in the voltage reference loop are the barriers of transistors 100 and 60 and the breakover voltage of Zener diode 66. The barrier voltages of any diodes 67 will also be included.

As is known, a silicon barrier decreases about 1 millivolt per degree F and Zener diodes also have specific temperature coefficients. Accordingly, all that is required to provide a suitable temperature responsive voltage reference means is to determine the change in battery float voltage required with temperature and provide for a combination of barriers to provide a similar change per degree F.

For example, it was found that the required float voltage for a typical nickel-cadmium battery was about 1.46 volts per cell and that this value decreases about 1 millivolt per cell per degree F increase in temperature. Thus, for a four-cell nickel-cadmium battery a total change of about 4 millivolts per degree F should be provided for in the voltage reference means 14. This may be conveniently provided by selecting a Zener diode 66 having a suitable temperature coefficient and adding as many extra diodes 67 as are required.

For example, in the foregoing described arrangement transistors 100 and 60 provide for 2 millivolts per degree F change in temperature. A Zener diode 66 having a temperature coefficient of about 1.3 millivolt per degree F can then be selected so that the combination thereof with the transistor devices produces a change of about 3 millivolts per degree F. Since about 4 millivolts per degree F should be provided all that is required to provide for a suitable temperature response is the addition of a single silicon diode 67, such as for example an A14A. This silicon diode 67 provides the required 1 millivolt per degree F for the total of 4.

In operation then when the temperature of the battery increases the silicon barrier of transistor 100 decreases by about 1 millivolt per degree F. Also the diode 67 in series with Zener diode 66 decreases about 1 millivolt per degree F. Since Zener diode 66 has a temperature coefficient of about 1.3 millivolt per degree F., the Zener 66, diode 67 and transistor 100 contribute together about a 3 millivolt change per degree F. Transistor 60 has a negative temperature coefficient of about 1 millivolt per degree F making a total of about 4 millivolts per degree F as required to match the change in battery voltage of about 1 millivolt per degree F. per cell.

While only a preferred embodiment of the invention has been shown by way of illustration, many changes and modifications will occur to those skilled in the art. It is, therefore, to be understood that the appended claims are intended to cover all such changes and modifications as fall within the true spirit and scope of the invention.

I claim:

1. A battery-charging control system connectable between a source of charging current and a battery which may have current-consuming equipment connected thereto, the combination comprising:
   a power-controlling device connected between said battery and said source of charging current so that said battery receives current flow from said power controlling device and varies in voltage value; control circuit means for controlling said power-controlling device to control the battery voltage in accordance with the value established by a voltage reference means, voltage reference means controlling said control circuit means and having a first portion establishing a first reference value related to a first battery voltage and a second portion establishing a second reference value related to a preselected higher battery voltage; battery voltage-sensing circuit means coupled to said voltage reference means, voltage control circuit means coupled to said voltage reference means and responsive to said battery voltage-sensing circuit means for coupling said second portion in effective circuit relationship in the voltage reference means whereby said control circuit means is selectively controlled at said second reference value upon the battery voltage falling below the first battery voltage value and is maintained at said second reference value until said battery attains a preselected higher voltage value; and additional voltage control circuit means responsive to said battery voltage-sensing circuit means for decoupling said second portion and coupling only said first portion in effective circuit relationship in said voltage reference means upon the battery attaining the preselected higher voltage value whereby said first reference value selectively controls operation of said control circuit means as long as the battery voltage does not fall below said first voltage reference value.

2. The battery-charging control system recited in claim 1 wherein said voltage reference means is comprised of temperature responsive elements operative to cause the values of said voltage reference to change in a predetermined manner with changes in temperature.

3. The battery-charging control system recited in claim 1 further including current limiting circuit means coupled to and controlling said control circuit means for limiting the maximum charging current to a predetermined level.

4. The battery-charging control system recited in claim 1 further including adjusting means coupled to said battery voltage-sensing circuit means to adjust the same to accommodate different size batteries, and load-limiting coupling circuit means for coupling said voltage reference means to said battery voltage-sensing circuit means for minimizing the loading effect thereon.

5. The battery-charging control system recited in claim 1 wherein said first portion of said voltage reference means includes a Zener diode operatively coupled to said battery voltage sensing circuit means for essentially establishing the first voltage reference value and the voltage control circuit means comprises a first voltage control transistor responsive to current flow through the Zener diode to couple said second portion of the voltage reference means in effective circuit relationship in controlling the operation of the control circuit means.

6. The battery-charging control system recited in claim 2 wherein said second portion of said voltage reference means includes an adjustable resistor and parallel connected latching transistor for substantially shunting said adjustable resistor upon being rendered conductive with said adjustable resistor serving to establish the second higher reference voltage with the latching transistor in the nonconducting condition, and the additional voltage control circuit means includes a second voltage control transistor responsive to current flow through said first voltage control transistor for controlling turn-on and turnoff of said latching transistor.

7. The battery-charging control system recited in claim 6 further including current limiting circuit means coupled to and controlling said control circuit means for limiting the maximum charging current to a predetermined level.

8. The battery-charging control system recited in claim 7 wherein said voltage reference means is comprised of temperature responsive elements operative to cause the values of said voltage reference to change in a predetermined manner with changes in temperature.

9. The battery-charging control system recited in claim 8 further including adjusting means coupled to said battery voltage sensing circuit means to adjust the same to accommodate different size batteries, and load-limiting coupling circuit means for coupling said voltage reference means to said battery voltage sensing circuit means for minimizing the loading effect thereon.

10. An automatic battery charging and voltage regulating system connectable between a source of voltage and a battery which may have current consuming equipment connected thereto, comprising:
a power transistor connected between said voltage source and said battery so that said battery receives current flow from said source through said power transistor and varies in voltage value; battery voltage-sensing circuit means; voltage reference means responsive to said battery voltage-sensing circuit means and including a first portion capable of selectively providing a first voltage reference value related to a first battery voltage value and a second portion coacting with said first portion and capable of selectively providing a second voltage reference value related to a preselected higher battery voltage value; control circuit means responsive to the voltage reference means to controlling the conductivity of said power transistor to control the battery voltage in accordance with the value established by said voltage reference means; a first voltage control transistor connected with both said first and second portions of said voltage reference means for selectively connecting both portions thereof in effective circuit relationship to establish the second voltage reference value whenever the battery voltage is below the first voltage reference value as established by said first portion and for maintaining said second voltage reference value until the battery attains the preselected higher voltage value; and a second voltage control transistor responsive to a preselected value of current flow through said first voltage control transistor for effectively disconnecting said second portion from said voltage reference means to thereby establish the first voltage reference value for controlling the control circuit means in response to the battery attaining the preselected higher second reference voltage value.

11. The automatic battery-charging and voltage-regulating system recited in claim 10 further including current-limiting circuit means operatively connected with and controlling said control circuit means for limiting the maximum output current of the system to a predetermined level.

12. The automatic battery-charging and voltage-regulating system recited in claim 11 wherein said voltage reference means is comprised of temperature responsive elements designed to cause the value of said voltage reference means to change in a predetermined manner with changes in temperature.

13. The battery-charging control system recited in claim 12 further including adjusting means coupled to said battery voltage-sensing circuit means to adjust the same to accommodate different size batteries, and load-limiting coupling circuit means for coupling said voltage reference means to said battery voltage-sensing circuit means for minimizing the loading effect thereon.

14. In a battery-charging system of the type including a transformer and a rectifier to provide a charging current source from an alternating current voltage supply, a control system for automatically bringing the battery to its fully charged condition and thereafter regulating the voltage value to maintain the battery in its fully charged condition comprising:
a power transistor connected in series circuit relationship between said charging current source and said battery so that said battery receives current flow from said source through said power transistor and varies in voltage value; a second transistor connected to said power transistor at the base thereof and providing base drive current for said power transistor for controlling the conductivity thereof; a third transistor connected to said second transistor at the base thereof and arranged to bypass base current from said second transistor to control its conductivity; current level-detecting and limiting means including current sensing means and a fourth transistor being responsive to the current-sensing means and connected to said third transistor at the base thereof, said fourth transistor being arranged to become conducting when the charging current sensed by said sensing means reaches a predetermined level and provides base drive current for said third transistor to limit current flow through said power transistor; voltage reference means providing a voltage-regulating control signal to the base of said third transistor in conjunction with said current level detecting and limiting means, said voltage reference means comprising first and second voltage reference portions, said first portion provided by a voltage breakover device and the P-N junction barrier voltage of a first voltage control transistor and said second portion being provided by an adjustable resistor; a latching transistor connected in series with said first voltage control transistor and in shunt with said second reference portion so that said second reference portion is made part of or removed from the effective value of said voltage reference means as said latching transistor is in a nonconducting and conducting condition, respectively; a second voltage transistor responsive to current flow through said first voltage control transistor and arranged to become conducting upon said first voltage control transistor being rendered conductive and connected in regenerative relationship with said latching transistor to cause said latching transistor to quickly become saturated after said first and second voltage control transistors become conductive; circuit means coupling said first and second voltage control transistors to the base of said third transistor for controlling operation thereof in conjunction with said current level-detecting and limiting means; battery voltage-sensing circuit means for deriving a voltage signal proportional to the battery voltage; and means applying the voltage signal derived from said battery voltage sensing means to said voltage reference means.

15. The battery-charging system recited in claim 14 wherein at least the voltage sensitive breakover device connected with said voltage reference means is temperature responsive to cause the value thereof to change in a predetermined manner with changes in temperature.

16. The battery-charging system recited in claim 15 wherein at least one additional temperature responsive P-N junction device is connected in series circuit relationship with said voltage breakover device.

17. The battery-charging control system recited in claim 16 wherein adjusting means are provided to the battery voltage sensing circuit means to adjust the same to accommodate different size batteries, and wherein the means for applying the voltage signal derived from the battery voltage sensing circuit means to the voltage reference means comprises load-limiting coupling circuit means for minimizing the loading effect of the voltage reference means on the battery voltage-sensing circuit means.